(12) United States Patent
Zhang et al.

(10) Patent No.: US 11,603,581 B2
(45) Date of Patent: *Mar. 14, 2023

(54) HIGH-STRENGTH ALUMINUM ALLOY COATINGS, DEFORMATION LAYERS AND METHODS OF MAKING THE SAME

(71) Applicant: Purdue Research Foundation, West Lafayette, IN (US)

(72) Inventors: Xinghang Zhang, West Lafayette, IN (US); Qiang Li, West Lafayette, IN (US); Haiyan Wang, West Lafayette, IN (US); Sichuang Xue, West Lafayette, IN (US); Yifan Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,844

(22) Filed: Jun. 25, 2021

(65) Prior Publication Data

US 2022/0002842 A1 Jan. 6, 2022

Related U.S. Application Data

(62) Division of application No. 15/949,436, filed on Apr. 10, 2018, now Pat. No. 11,047,024.

(60) Provisional application No. 62/484,771, filed on Apr. 12, 2017.

(51) Int. Cl.
| | |
|---|---|
| C22C 21/00 | (2006.01) |
| C22F 1/04 | (2006.01) |
| B32B 15/01 | (2006.01) |

(52) U.S. Cl.
CPC ............ *C22C 21/00* (2013.01); *B32B 15/016* (2013.01); *C22F 1/04* (2013.01); *B32B 2307/536* (2013.01); *Y10T 428/12764* (2015.01)

(58) Field of Classification Search
None
See application file for complete search history.

(56) References Cited

U.S. PATENT DOCUMENTS 11,047,024 B2 * 6/2021 Zhang ...................... C22F 1/04

* cited by examiner

*Primary Examiner* — Daniel J. Schleis
(74) *Attorney, Agent, or Firm* — Purdue Research Foundation

(57) ABSTRACT

A high-strength aluminum alloy coating. The coating includes aluminum, 9R phase, fine grains, nanotwins, stacking faults, and a solute capable of stabilizing the 9R phase, the fine grains, and the stacking faults. A method of making a high-strength aluminum alloy coating on a substrate. The method includes, depositing the constituents of an aluminum alloy on a substrate such that the deposit forms a high-strength aluminum alloy coating containing 9R phase, fine grains, nanotwins, and stacking faults. A high-strength deformation layer in and on a casting of an aluminum alloy containing 9R phase, fine grains, nanotwins, stacking faults, and a solute capable of stabilizing the PR phase, the fine grains, and the stacking faults. A method of making a high-strength deformation layer in and on a casting of an aluminum alloy by deforming the alloy such that deformation layer contains 9R phase, fine grains, nanotwins, and stacking faults.

16 Claims, 17 Drawing Sheets

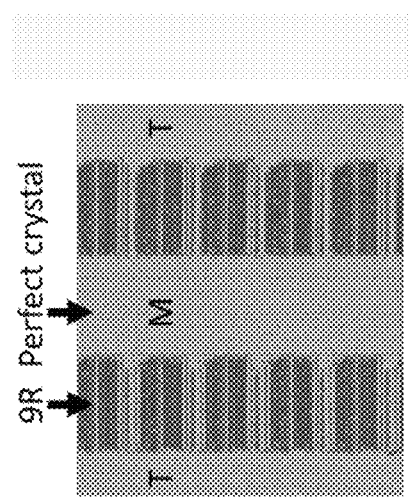
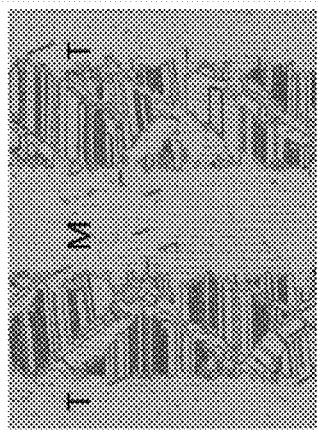
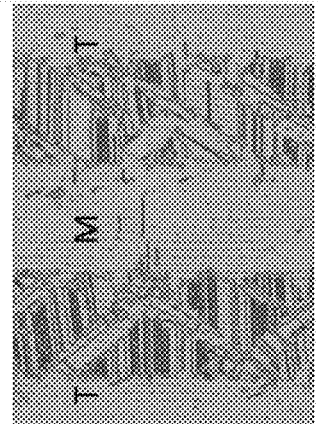
FIG. 4A
FIG. 4B
FIG. 4C
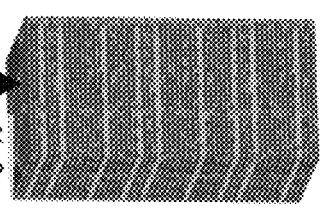
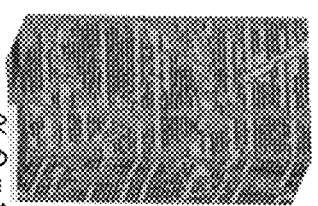
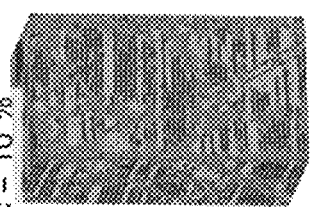

HIGH-STRENGTH ALUMINUM ALLOY COATINGS, DEFORMATION LAYERS AND METHODS OF MAKING THE SAME

CROSS-REFERENCE TO RELATED APPLICATIONS

The present U.S. patent application is a divisional of U.S. patent application Ser. No. 15/949,436 filed Apr. 10, 2018, which is related to and claims the priority benefit of U.S. Provisional Patent Application Ser. No. 62/484,771 filed Apr. 12, 2017, the contents of which are hereby incorporated by reference in their entirety into the present disclosure.

STATEMENT REGARDING GOVERNMENT FUNDING

This invention was made with government support under DE-SC0016337 awarded by the Department of Energy. The government has certain rights in the invention.

TECHNICAL FIELD

This disclosure relates high-strength aluminum alloy coatings on substrates and high-strength deformation layers in and on aluminum alloy castings with engineered microstructural and grain boundary features and methods of making such high-strength aluminum alloy.

BACKGROUND

This section introduces aspects that may help facilitate a better understanding of the disclosure. Accordingly, these statements are to be read in this light and are not to be understood as admissions about what is or is not prior art.

The ever-increasing demand for high-strength, light-weight automotive-grade materials, driven by the requirement for high fuel efficiency, makes development of novel ultra-strong and ductile Aluminum (Al) alloys a priority. Steels that hold analogous specific strength outperform Al alloys. For instance, advanced high-strength steels (AHSS) and "GigaPascal steels" have tensile strength in excess of 780 MPa and 1 GPa, respectively. Matlock and Speer predicted that the strength of the 3rd generation AHSS could potentially approach ~2 GPa. In contrast, it remains a tremendous challenge for Al alloys to achieve a flow stress of 1 GPa.

The best commercial Al alloys (typically age hardened) have a yield strength of ~0.7 GPa. High strength (~1 GPa) has hitherto been achievable in rare cases, in some transition metal and/or rare earth element-incorporated Al based metallic glasses and ceramic particles-embedded composites. However, Al based metallic glasses typically show poor ductility. Grain refinement via severe plastic deformation or cryomilling can increase the tensile strength of Al alloys through confinement of the dislocation migration. However, grain growth occurs at ambient temperature and under low flow stress for nanocrystalline (nc) metals. Moreover, significant reduction of grain size in nc monolithic and alloyed metals have shown softening phenomenon (smaller grains lead to lower yield strength), resulting from grain boundary-mediated activities when grain size falls below critical value.

Thus, there exists an unmet need for fabricating high-strength aluminum alloys and/or high-strength al-alloy coatings without compromising ductility and without any attendant softening phenomenon observed in nanocrystalline metals and alloys.

SUMMARY

A high-strength aluminum alloy coating is disclosed. The coating includes aluminum 9R phase, fine grains, nanotwins, stacking faults, and a solute capable of stabilizing the 9R phase, the fine grains, and the stacking faults.

A method of making a high-strength aluminum alloy coating on a substrate disclosed. The method includes, providing a substrate, depositing atoms of the constituents of an aluminum alloy on the substrate utilizing a deposition method, such that the deposited atoms form a high-strength aluminum alloy coating containing 9R phase, fine grains, nanotwins, and stacking faults.

A high-strength deformation layer in and on a casting of an aluminum alloy is disclosed. The high-strength deformation layer includes an aluminum alloy comprising aluminum, 9R phase, fine grains, nanotwins, stacking faults, and a solute capable of stabilizing the PR phase, the fine grains, and the stacking faults.

A method of making a high-strength deformation layer in and on a casting of an aluminum alloy is disclosed. The method includes providing a casting of an aluminum alloy, and deforming the alloy by a deformation method, such that the deformation results in a high-strength aluminum alloy comprising a deformation layer containing 9R phase, fine grains, nanotwins, and stacking faults.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

FIGS. 4A through 4C show MD simulations of uniaxial compressions on Al-5 at. % Fe with certain columns fully populated with 9R phase bounded by two perfect crystal columns with twin relation (T and M denote twin and matrix, respectively).

DETAILED DESCRIPTION

Figure 1B:
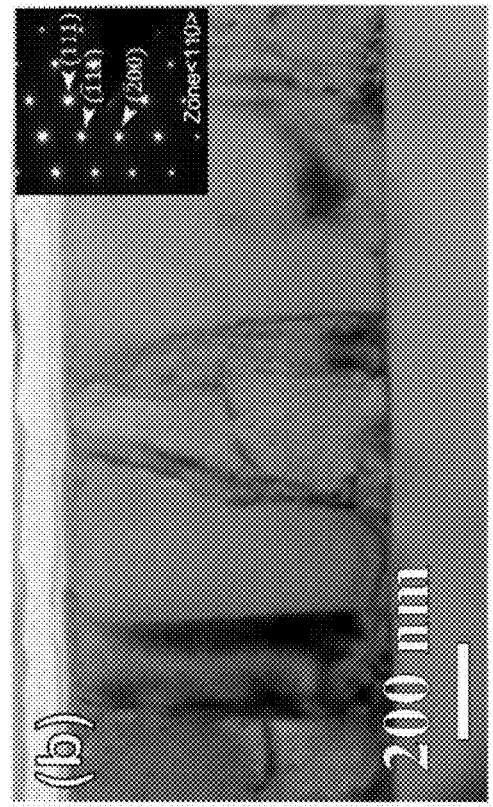
FIG. 1B is an XTEM image of a cross-section of monolithic Al (111) film.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

In this disclosure, the words film and coating are used interchangeably and mean a surface layer formed on a physical object. Also, it is to be noted that in structures containing nanotwins (known to those skilled in the art), there is inter-twin spacing associated with the nanotwins. The inter twin spacing is similar to grain size or column size that varies from ~120 nm to ~2 nm with different Fe compositions.

Grain Boundary (GB) engineering is an important avenue to improving the mechanical strength of materials as investigated experimentally and by molecular dynamic (MD) simulations in literature. An effective approach to accomplish high strength via GB engineering is to use low-Σ boundaries, particularly Σ3 {111} coherent twin boundaries (CTBs). The relation between the number of lattice points in the unit cell of a coincident site lattice (CSL) and the number of lattice points in a unit cell of the generating lattice is called Σ (Sigma); Sigma is the unit cell volume of the CSL in units of the unit cell volume of the elementary cells of the crystals. These notations and aspects are well described in literature and are well understood by those skilled in in the area of materials engineering. Nanotwinned (nt) metals with CTBs exhibit high strength, ductility, electrical conductivity, and superior thermal stability. CTBs serve as an effective strengthening motif by blocking dislocation motion and can also accommodate plastic strain by storing dislocations and even migrate under stress. Prior works on nt metals mostly concentrate on metals with low-to-intermediate stacking-fault energy (SFE, $\gamma_{sf}$), such as Ag (SFE=16 mJ/m$^2$), Cu (SFE=45 mJ/m$^2$), Cu alloys, and 330 austenitic stainless steels (SFE=10-20 mJ/m$^2$), due to the ease of formation of growth twins. In Al with high SFE of 120-144 mJ/m$^2$, sporadic deformation twins have been observed in deformed nanocrystals or under extreme conditions, e.g. near crack tips or indentation edge, under high stress and strain rate or deformation at cryogenic temperature. Although dislocation-twin interactions in twinned Al have been studied by MD simulations, it remains challenging to introduce high-density growth twins in Al and the concept of engineering twin boundaries (TBs) to macroscopically strengthen Al and Al alloys has not been actualized. Recently, incoherent twin boundaries (ITBs) have been successfully introduced into Al by adopting nt Ag as seed layers. In situ nanoindentation and MD simulations prove that the ITBs in Al act as strong barriers to dislocation pile-up, and eventually allow dislocation transmission at the steps along ITBs. The hardness of these Al films remains low, ~1 GPa, corresponding to a flow stress of 300 MPa.

In this disclosure, the fabrication of high-strength, twinned Al-xFe (x=1-10 at. %) solid solution films with a substantial volume fraction (~25%) of 9R phase is described. 9R phase is well understood by those skilled in the art. In this disclosure, in describing Al—Fe alloys, % Fe refers to atomic percent of iron. The hardness of Al—Fe films of this disclosure reaches 5.5 GPa. In situ pillar compression tests reveal that the Al—Fe films of this disclosure have flow stress exceeding 1.5 GPa, comparable to high-strength martensitic steels, and exhibit giant strain hardening ability. DFT (density function theory) calculations show that the addition of Fe increases the SFE of Al. However, Fe increases the ratio between unstable SFE and stable SFE ($\gamma_{us}f/\gamma_{sf}$) and significantly enhances the stability of growth twins and 9R phase. MD simulations show that the ultra-high strength of Al—Fe films of this disclosure derives from the dislocation-ITB and 9R phase interactions.

Figure 1C:
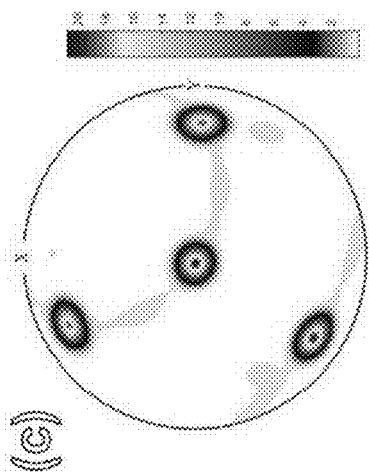
FIG. 1C shows (111) x-ray pole figure of monolithic Al indicating highly textured (111) Al.
Figure 1A:
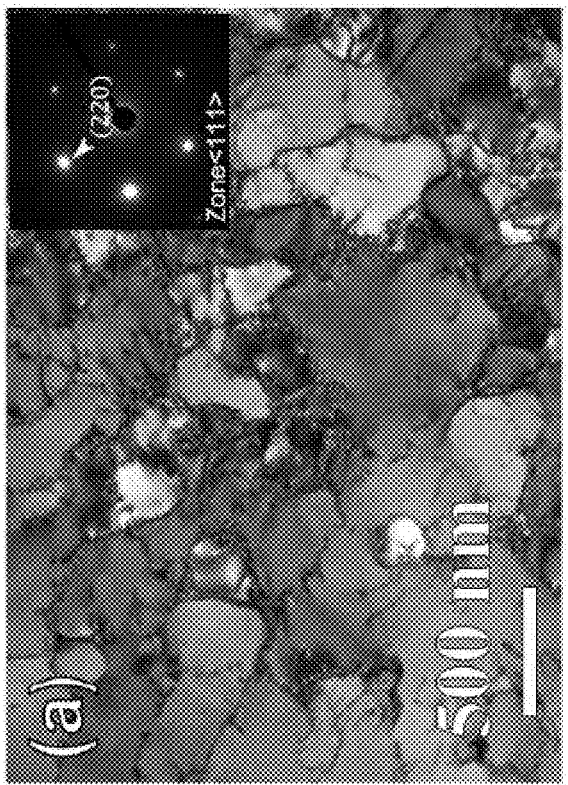
FIG. 1A is an image of bright-field plan-view of monolithic Al (111) film.
Figure 1E:
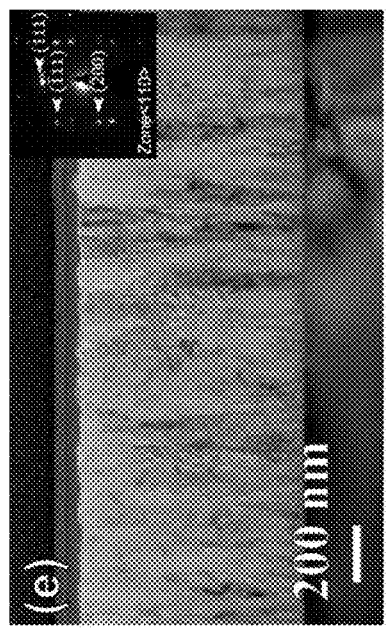
FIG. 1E is a cross-section TEM image of sputtered Al-2.5% Fe films with nanocolumns. The inserted SAED pattern shows the formation of twins.
Figure 1F:
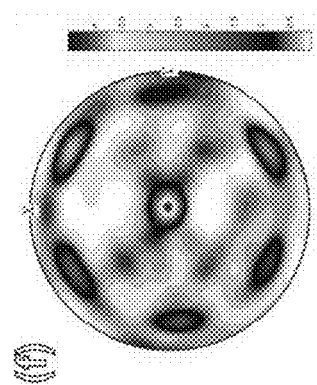
FIG. 1F is the (111) pole figure of Al-2.5% Fe specimen. The six bright spots with similar intensity in the (111) pole figure demonstrates a highly twinned Al-2.5% Fe specimen with 6 fold symmetry. The average columnar grain size of Al—Fe films declines sharply with increasing Fe concentration.
Figure 1D:
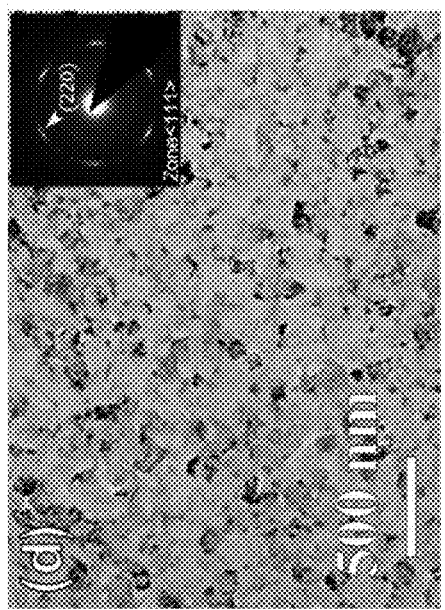
FIG. 1D is a plan-view TEM image of sputtered Al-2.5% Fe films with nanocolumns. The inserted SAED pattern displays slight in-plane rotation amongst columnar grains.

In experiments leading to this disclosure, Al and Al-xFe (x=1-10 at. %) alloys were deposited onto single crystal Si(111) substrates by direct current magnetron sputtering at a base pressure of 6-10×10$^{-8}$ Torr using Al (99.99%) and Fe (99.95%) targets. The co-sputtering of Al—Fe alloys can scale up the coatings in thickness by increasing deposition time and two exemplary thicknesses of coatings herein demonstrated are 1 μm and 20 μm. Plan-view and cross-section transmission electron microscopy (TEM) specimens were prepared by mechanical grinding and dimpling, followed by low-energy ion milling/polishing, and examined in FEI Tecnai G2 F20 and Talos 200× microscopes operated at 200 kV, equipped with Fischione ultra-high resolution high angle annular dark field (HADDF) detectors. X-ray diffraction (XRD) patterns were acquired on a Panalytical Empyrean X'pert PRO MRD diffractometer with a Cu Kai source. Pole figure measurements were conducted with the tube-in-line focus and a capillary X-ray lens with a spot opening of 1×1 mm² on the primary optics and parallel plate collimator on the detector side. FIGS. 1A and 1B are plan-view and cross-section TEM images indicating submicron columnar grains of monolithic Al grown on Si (111) substrate. The inserts in FIGS. 1A and 1B show selected area electron diffraction (SAED) patterns indicating that {111} Al is grown epitaxially on Si(111) substrates. FIG. 1C shows (111) x-ray pole figure of monolithic Al indicating highly textured (111) Al. FIG. 1D is a plan-view TEM image of sputtered Al-2.5% Fe films with nanoscale columnar grains (referred to as nanocolumns). The inserted SAED pattern displays slight in-plane rotation amongst columnar grains. FIG. 1E is a cross-section TEM image of sputtered Al-2.5% Fe films with nanocolumns. The SAED pattern in the insert of FIG. 1E shows the formation of twins. FIG. 1F is the (111) pole figure of Al-2.5% Fe specimen. The six bright spots with similar intensity in the (111) pole figure demonstrates a highly twinned Al-2.5% Fe specimen with 6 fold symmetry. The average columnar grain size of Al—Fe films declines sharply with increasing Fe concentration. Al grown epitaxially on Si(111) substrates with an average grain size of ~450 nm. In contrast, columnar grain size decreases to ~40 nm in Al-2.5% Fe (FIGS. 1D through 1E) and ~4 nm in Al-5.9% Fe as seen in the experiments. The SAED pattern of the plan-view TEM micrograph of Al-2.5% Fe also displays (111) texture, consistent with XRD patterns obtained. Referring to FIG. 1E, The SAED pattern of the XTEM (meaning cross-sectional TEM) micrograph of the Al-2.5% Fe specimen (FIG. 1E) reveals the classical twinned diffraction pattern examined along the Al <011> zone axis. Comparisons of XRD (111) pole figures show that monolithic Al has 3 fold symmetry, whereas a six-fold symmetry of equally bright {111} poles emerges in Al-2.5% Fe, indicative of a large fraction of twin variants in the highly textured films. Similarly, the twinned patterns were observed in XRD pole figure analyses along (200) and (220) poles in the studies leading to this disclosure.

Figure 1G:
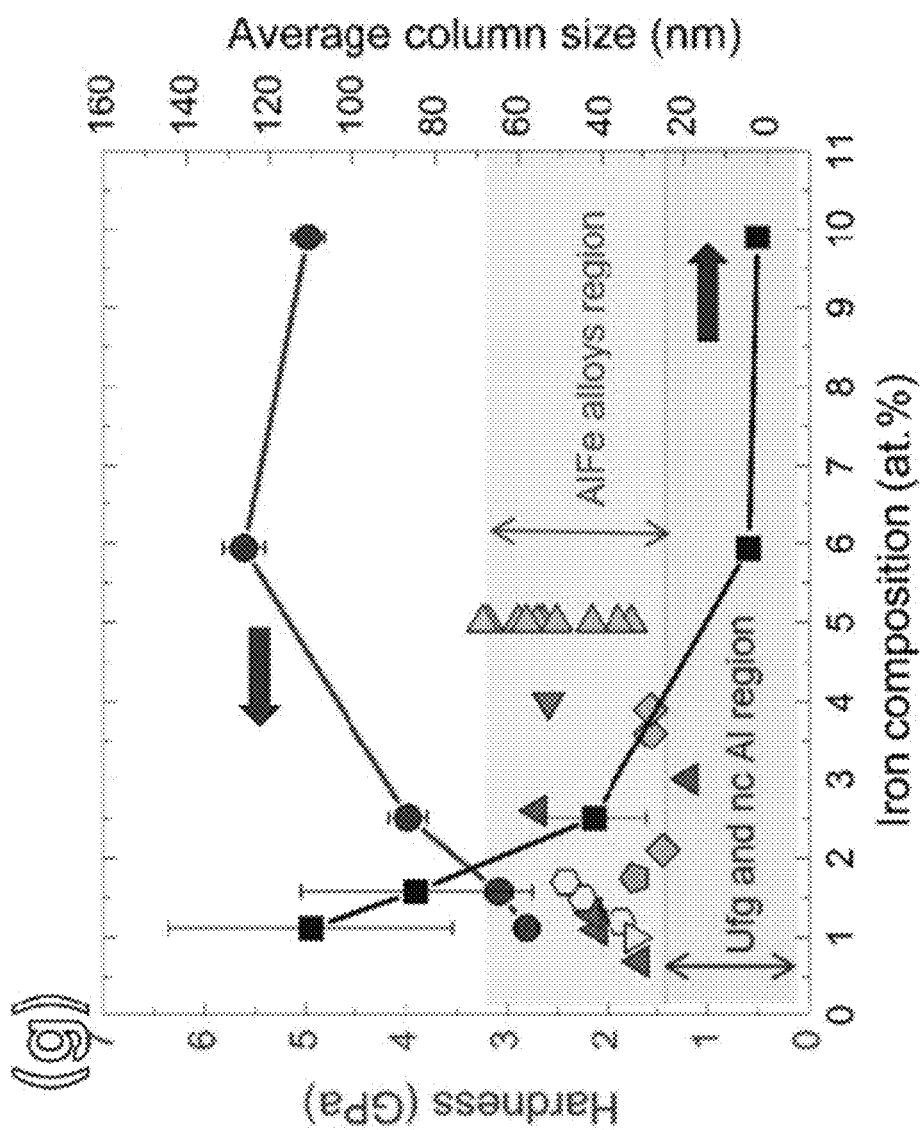
FIG. 1G shows plots of hardness and average grain column size of Al—Fe alloys of this disclosure as a function of iron composition.

Hardness and modulus of the alloys were determined using the instrumented nanoindentation technique on both Fischerscope 2000XYp nano/micro-indenter and Hysitron TI950 at different indentation depths. Maximum indentation depth was controlled not to exceed 15% of the film thickness to avoid substrate effect. FIG. 1G shows plots of hardness and average grain column size of Al—Fe alloy coatings with a thickness of 1 µm as a function of iron composition. The hardness of sputtered Al-5.9% Fe specimens approaches 5.6 GPa, much greater than that of monolithic nt Al, ~0.7 GPa, and previously reported ufg, nc Al and Al—Fe alloys. The columnar grain size decreases from ~130 to 2 nm with increasing Fe concentration. The evolution of hardness of nt Al—Fe measured by nanoindentation technique with composition of Fe is shown in FIG. 1G. The hardness of the nt Al alloys starts at 2.5±0.15 GPa for Al-1.1% Fe, reaches a maximum value of 5.5±0.1 GPa for Al-5.9% Fe, and then decreases to 4.7±0.2 GPa for Al-9.9% Fe. It has been reported in literature that a quaternary $Al_{84}Ni_7Gd_6Co_3$ alloy containing nanoscale $Al_{19}Gd_3Ni_5$ and $Al_9Co_2$—$Al_3Gd$ intermetallics (with merely 23% fcc Al) fabricated by hot pressing of powders after ball milling for 100 h has shown similar level of hardness. First principle density function theory (DFT) calculations predicted virtually zero strength for Al—Fe with parts per million of Fe solutes. Prior studies on Al—Fe alloys are summarized in FIG. 1G. The current nt Al—Fe alloys have the highest strength among all Al—Fe alloys reported to date. Epitaxial nt Al with ~200 nm ITB spacing has a hardness of 1.2 GPa, comparable to the hardness of nc Al with a grain size of 30-50 nm. Referring to FIG. 1G, the hardness of sputtered Al-5.9% Fe specimens approaches 5.6 GPa, much greater than that of monolithic nt Al, ~0.7 GPa, and previously reported ultra-fine grained (ufg), nc Al and Al—Fe alloys. The columnar grain size decreases from ~130 to 2 nm with increasing Fe concentration.

Figure 1H:
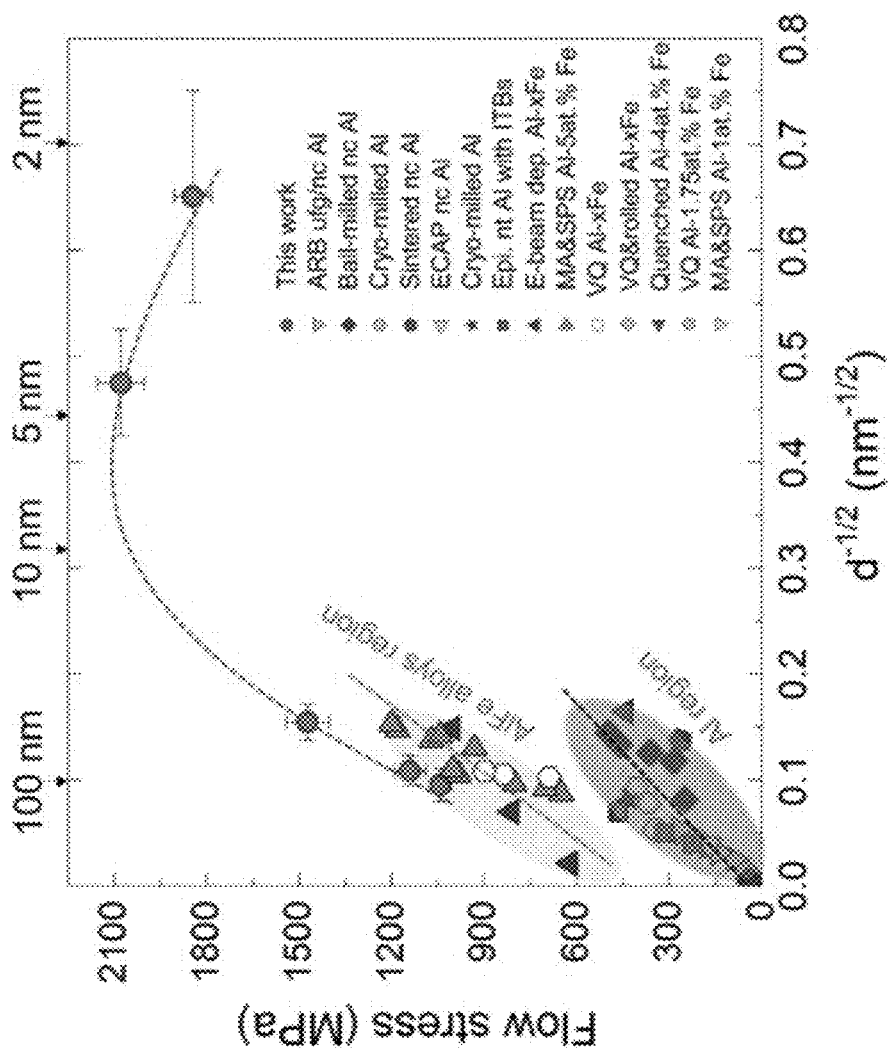
FIG. 1H shows the Hall-Petch plot for the Al-xFe specimens and the selected ufg and nc monolithic Al and Al-xFe alloys processed via different techniques. In comparison to the monolithic Al and Al-xFe alloys, the sputtered Al—Fe films have exceptionally high flow stress (hardness/2.7).

The mechanical performance of nt Al—Fe is further analyzed by using flow stress converted from hardness divided by a Tabor factor of 2.7 in a Hall-Petch plot to investigate size-dependent strengthening. FIG. 1H shows the Hall-Petch plot for the Al-xFe specimens and the selected ufg and nc monolithic Al and Al-xFe alloys processed susvia different techniques. In comparison to the monolithic Al and Al-xFe alloys, the sputtered Al—Fe films have exceptionally high flow stress (hardness/2.7). A variety of solutes, such as Ag, Mo, Cr and W, were selected to alloy with Al using similar deposition parameters, but the hardness of these binary Al alloys hardly exceeded 3.5 GPa while keeping solute concentration to 10 at. % or less, as evidenced from the studies leading to this disclosure.

Figure 1I:
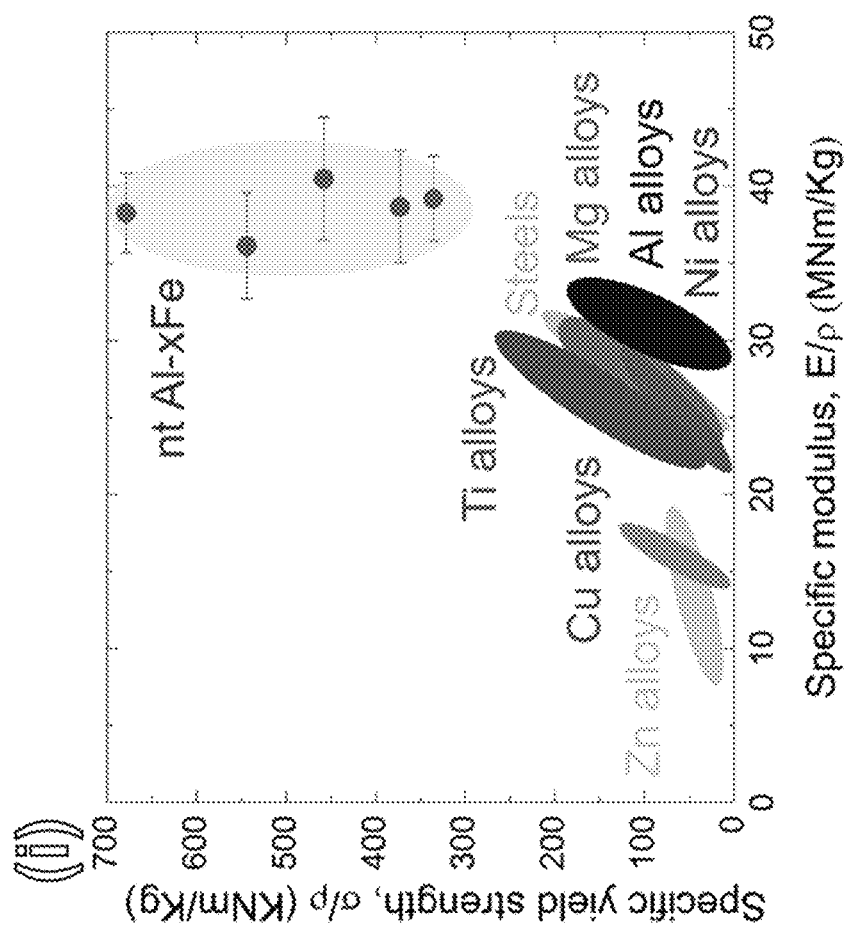
FIG. 1I shows Ashby map of specific strength vs. specific modulus for various alloys.

FIG. 1I show the Ashby map, which refers to a map showing specific strength vs. specific modulus for various alloys. In general, materials with high specific strength and high specific modulus are preferred. In other words, it is desirable for the materials whose values fall into the upper right portion of the map. Conventional Al alloys already have high specific modulus, but they have low specific strength as shown in FIG. 1. An objective of this disclosure is to significantly boost the specific strength of the Al alloys. The high-strength aluminum coatings of this disclosure appear in the upper right portion of the plot in FIG. 1I. To facilitate the TEM sample preparations, the film thickness in FIG. 1 is 1 µm.

Figure 2C:
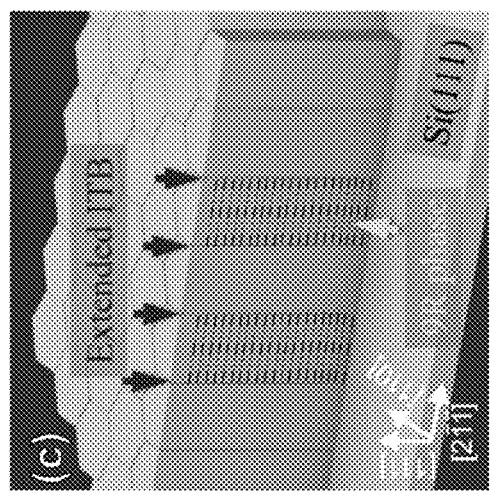
FIG. 2C illustrates the formation the microstructure of Al-2.5% Fe films.
Figure 2B:
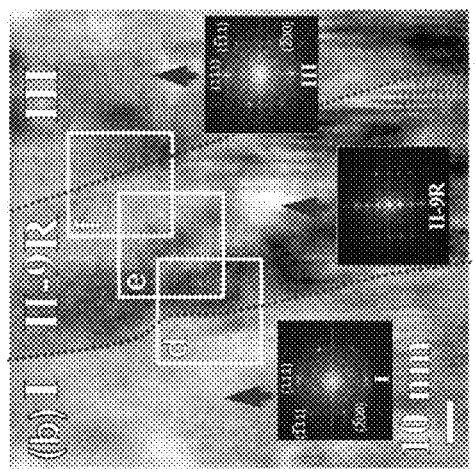
FIG. 2B shows ae magnified TEM micrograph of 3 adjacent columns in as-deposited Al-2.5% Fe films and the corresponding fast Fourier transform (FFT) patterns indicate column I and III have twin relation, whereas the FFT of column II shows the formation of 9R structures.
Figure 2A:
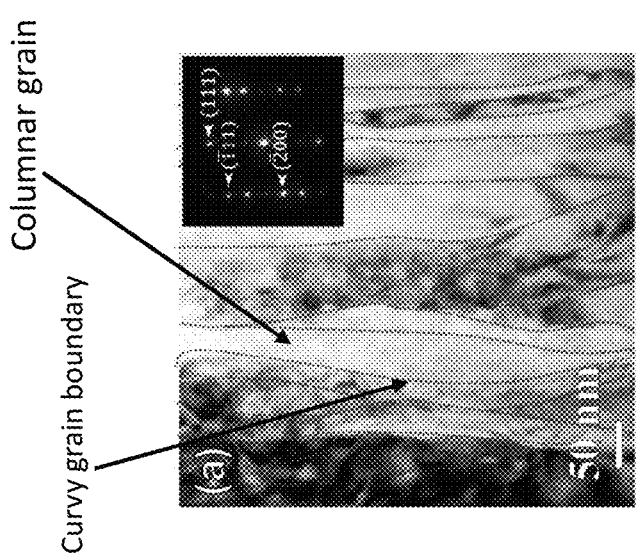
FIG. 2A shows a low magnification cross-section TEM image of as-deposited Al-2.5% Fe film showing columnar grains, ~42 nm in diameter; the inserted SAED pattern shows typical twin structures in highly (111) textured films.
Figure 2F:
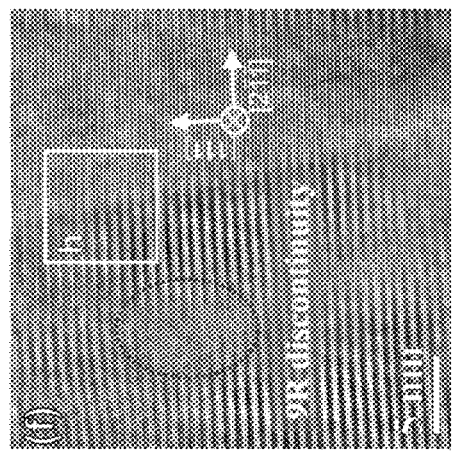
FIGS. 2D through 2F show HRTEM micrographs of the three boxes in FIG. 2B showing that column II is fully populated with the 9R phase.
Figure 2E:
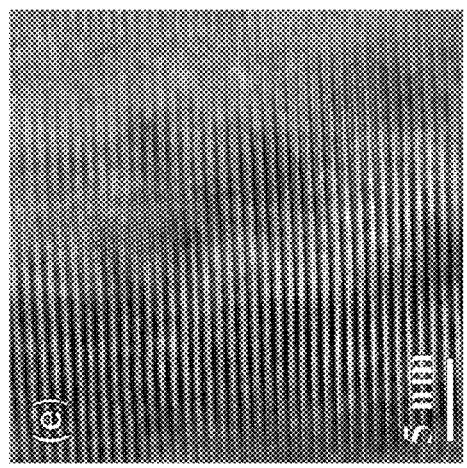
Figure 2D:
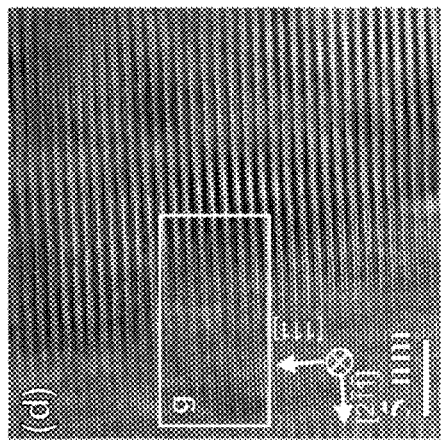
Figure 2H:
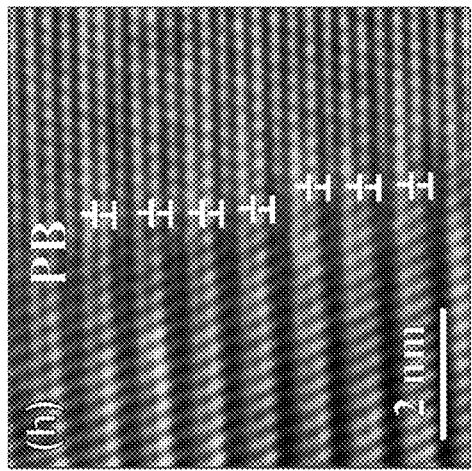
FIGS. 2G through 2H show magnified HRTEM micrographs confirming the formation of intermingled 9R phase across the phase boundary (PB).
Figure 2G:
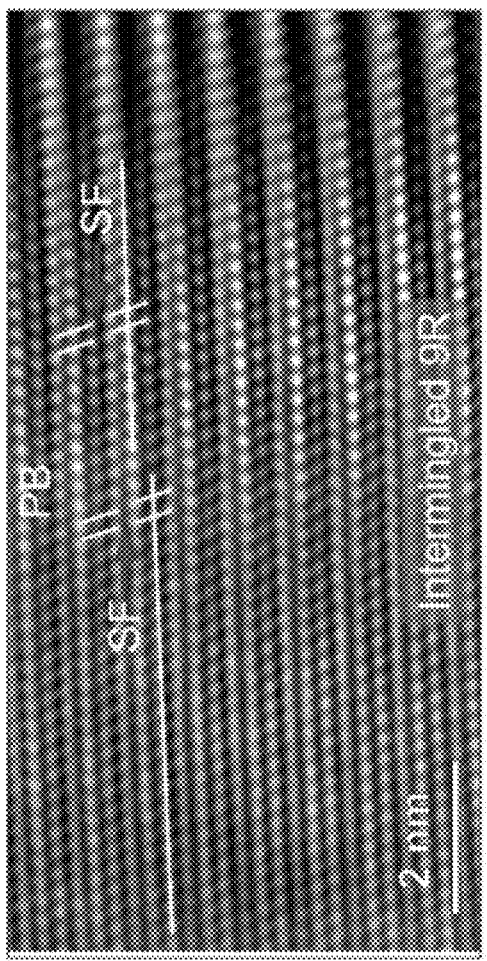

FIGS. 2A through 2H show microstructures of as-deposited Al-2.5% Fe films. FIG. 2A shows a low magnification cross-section TEM image of as-deposited Al-2.5% Fe film showing columnar grains, ~41 nm in diameter; the insert of FIG. 2A, the SAED pattern, shows typical twin structures in highly (111) textured films. FIG. 2B shows magnified TEM micrograph of 3 adjacent columns, indicated as I, II, and III in FIG. 2B, in as-deposited Al-2.5% Fe film; the corresponding fast Fourier transform (FFT) patterns indicate column I and III have twin relation, whereas the FFT of column II shows the formation of 9R structures. FIG. 2C is a schematic illustration of the formation the microstructure of Al-2.5% Fe films. FIGS. 2D through 2F show High-resolution TEM (HRTEM) micrographs of the three boxes, labeled d, e, and f, in FIG. 2B showing that column II is fully populated with the 9R phase. FIGS. 2G through 2H show magnified HRTEM micrographs confirming the formation of intermingled 9R phase across the phase boundary (PB). Intermingling here refers to intermixing of two 9R phases. Referring to FIG. 2G, the magnified HRTEM micrographs highlight the diffused left PB of the 9R phase containing intermingled structure (repeating SFs in 9R at two sides of PB have one {111} interplanar distance difference) and the relatively sharp right PB.

An examination of XTEM micrograph of the Al-2.5% Fe films in FIG. 2A shows curvy grain boundary geometry and, interestingly 9R phase entire columns in many cases (FIG. 2B)), and the giant 9R (~50 nm in width) is often bounded by two adjacent columns with twin relations as shown by the fast Fourier transform (FFT) as insets (FIG. 2B). The volume fraction of 9R phase is estimated as ~25%, and the microstructure of the film containing 9R phase is shown schematically in FIG. 2C. High resolution TEM (HRTEM) micrographs, FIGS. 2D through 2F show the left, middle and right sections, respectively, of a typical 9R structure. The 9R phase typically contains three Shockley partials, one edge and two mixed partials, on adjacent {111} planes. An intermingled 9R structure is found on the left boundary of the 9R phase (FIG. 2D). Few regions that ensemble perfect crystal are also observed and break the continuity of 9R phase (FIG. 2E).

To investigate the deformability of the Al and Al—Fe alloys, pillars with ~500 nm in diameter and a diameter-to-height aspect ratio of ~1:2 were fabricated through focused ion beam (FIB) and a series of concentric annular milling and polishing with progressively de-escalated currents were applied to minimize the substrate engagement and tapering. A Hysitron PI 87xR PicoIndenter equipped with a 5 μm diamond flat punch tip was used to conduct in situ compression experiments inside an FEI quanta 3D FEG scanning electron microscope. A piezoelectric actuator on the capacitive transducer enables the collection of force-displacement data and the morphological evolution of the micropillar was captured concurrently during real-time deformation. An average drift rate of 0.2 nm/s was estimated in preloading process and all the experiments were finished in about 60 s and the estimated noise for force measurement is ±5 μN. The ex-situ compressions were performed using 8 μm flat punch in Hysitron TI 950 TriboIndenter equipped with a transducer with 1 nN load resolution and the thermal drift rate was below 0.05 nm/s and monitored for 40 s prior to compressions conducted at a strain rate of $1 \times 10^{-3}$/s for ~150 s.

Figure 3A:
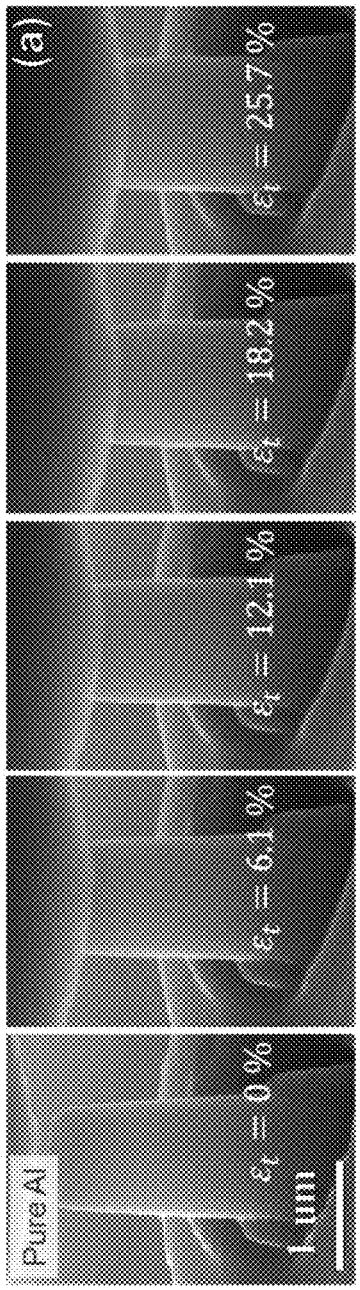
FIGS. 3A through 3C are SEM micrographs of pillars of Al(111) (FIG. 3A) and Al-xFe (x=2.5 or 5.9 at. %, FIGS. 3B and 3C respectively) captured during in situ pillar compression tests at different strains.
Figure 3B:
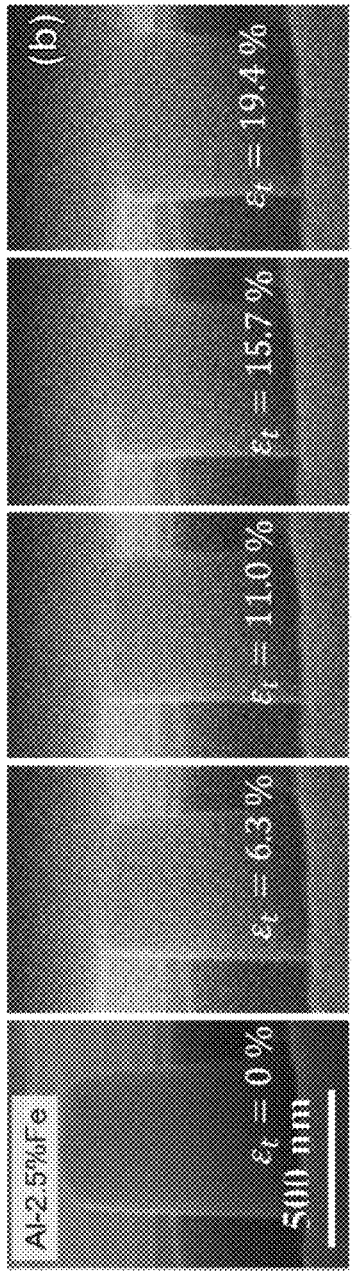
Figure 3C:
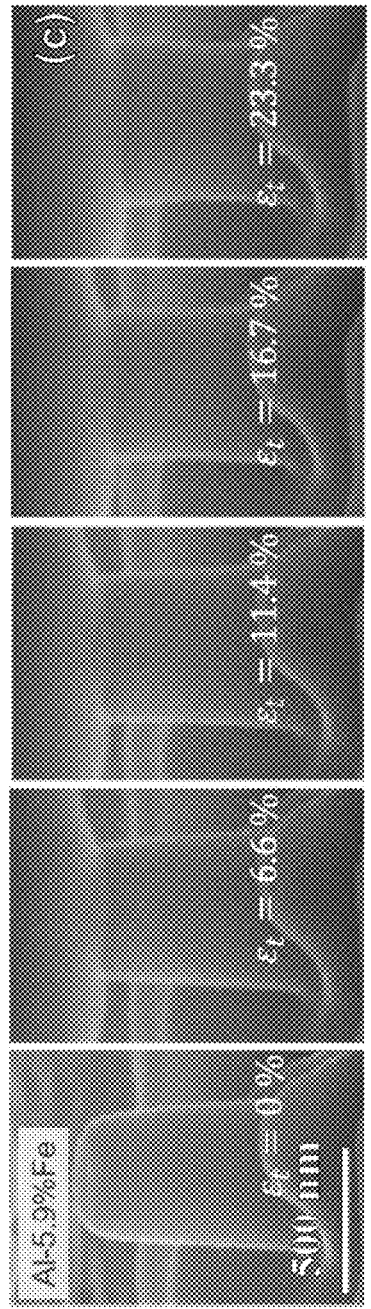
Figure 3E:
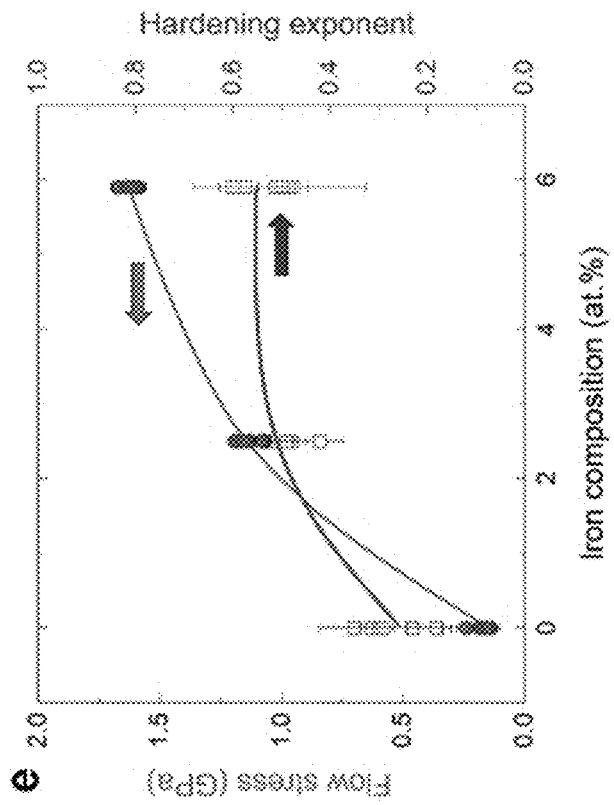
FIG. 3E shows the flow stresses and hardening exponent vs. Fe content derived from compression tests on pillars fabricated from as-deposited Al(111) and Al—Fe films.

In situ uniaxial compression tests were performed on pillars fabricated from as-deposited Al(111) and Al—Fe films performed inside a scanning electron microscope. FIGS. 3A through 3C show SEM micrographs of pillars of Al(111) and Al-xFe (x=2.5 or 5.9 at. %) captured during in situ pillar compression tests at different strains. The Al—Fe specimens exhibit ductile deformation behaviors with no detectable shear banding (offset) event. Referring to FIGS. 3 B and 3 C, it can be seen that the deformed Al—Fe pillars experience dilation on the top, in contrast to the conventional plastic barreling observed in monolithic nt Al as well as conventional softening. True stress-strain curves of the pillars shown in FIG. 3D indicate that the flow stress of Al-2.5% Fe and Al-5.9% Fe exceeds 1 and 1.6 GPa, respectively. Partial unloading experiment was performed to measure the elastic modulus of the pillars. The true stress-strain curves of the deformation volume, i.e. the dilated volume, is estimated by analyzing the instantaneous geometry variation synchronized to the mechanical response, the detailed methodology of which is explained in SI. The flow stresses at ~10% strain, shown in FIG. 3E, shows that the Al—Fe alloy films have significantly higher flow stress than monolithic Al films. Also, from FIG. 3E, the strain hardening exponent, n, of the Al—Fe films are found to be greater than that of monolithic Al films.

Figure 3D:
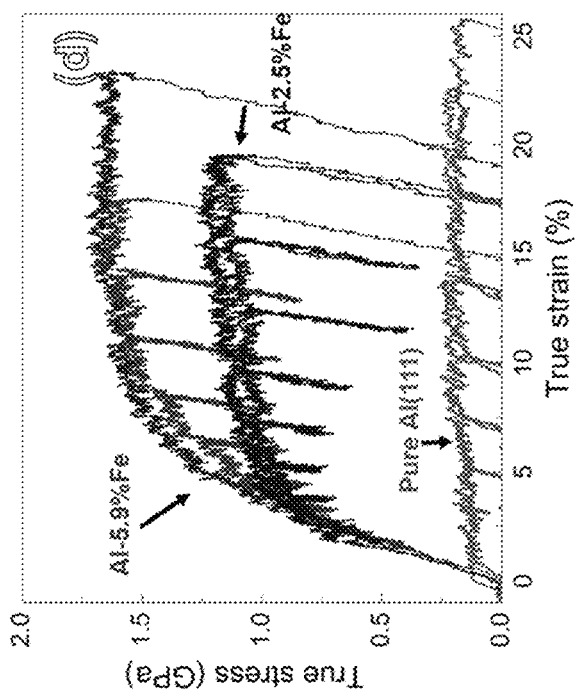
FIG. 3D shows true stress-true strain curves from compression tests on pillars fabricated from as-deposited Al(111) and Al—Fe films.

Further observations on the deformation experiments: In situ SEM micrographs in FIG. 3A shows ductile deformation of monolithic Al, as evidenced by barreling of the pillar, and the specimen is very soft, with a flow stress of 200 MPa (FIG. 3D). The SEM snapshots of Al-2.5% Fe alloys taken during deformation up to strain of 20% (FIG. 3B) show extensive deformation of the pillar, with a reverse conical frustum-shaped geometry in contrast to barreling of the compressed Al pillars. The calculated flow stress of Al-2.5% Fe after considering the geometry of pillars exceeds 1 GPa. Similar geometry change was observed in the Al-5.9% Fe micropillars (FIG. 3C). No shear offsets were observed in the specimen. At 10% strain, the flow stress of the Al-5.9% Fe exceeds 1.5 GPa. The ultra-high strength Al-5.9% Fe pillars can tolerate more than 50% true strain with no cracks. In addition to monotonic loading, multiple tests with numerous partial unloading were performed (FIG. 3D) to check the modulus and the reliability of methodology. The measured modulus of pillars ranges from 85 to 115 GPa.

Al is known to be soft and thus various types of strengthening approaches have been applied. Among these methods, age hardening through precipitation is widely used. Solid solution hardening alone is generally considered an inefficient method to accomplish significant strengthening in Al alloys. Grain refinement has also been widely adopted to increase the strength of Al alloys. But to date, the best commercial Al alloys, including 7XXX series Al alloys, only have flow stress up to 700 MPa. Tempering of certain 7XXX series of Al alloys has led to a maximum flow stress of ~1 GPa. For the coatings of this disclosure, the hardness and flow stress of nt Al—Fe reach 5.5 GPa and 1.5 GPa, respectively. The nt Al—Fe alloys exhibit superior strength compared with many other alloys on the Ashby map of specific strength versus specific elastic modulus (FIG. 1I). Three strengthening mechanisms, i.e. grain boundary, solid solution and dislocation strengthening, might contribute to the anomalously high strength. First, it has been widely adopted that nano-grains explain the improved strength through the constraint of dislocation motions, as elucidated by the empirical Hall-Petch law, but the strength of nanocrystalline Al hardly exceeds 600 MPa and softening may occur (smaller grain size lead to lower hardness) below certain grain sizes based on dislocation-accommodated grain boundary sliding. Second, the solid solution hardening estimated by the Fleischer equation is merely 0.26 GPa for Al-6% Fe.

High density of stacking faults in form of 9R phase as preexisting defects might contribute to significant strengthening and the solute-decorated ITBs may retard ITB migration and restrict dislocation transmission. The role of 9R on strengthening of metallic materials is largely overlooked. This is because that 9R phase is rare, even in metals with low SFE, such as Cu and Ag. In general, high density nanotwins are considered significant in achieving high strength and good ductility in nt metals with low SFEs. 9R phase is scarce in Al due to its high SFE. Even under high shear stress 9R phase has not been observed in Al or its alloys to date, in sharp contrast to low SFE Cu where 9R could form and propagate under shear stress. An asymmetric tilt on the {111} planes of 9R phase is detected relative to its two bounding columns. The breakage of the symmetry could be ascribed to the energy minimization by structural relaxation envisioned by MD and the 9R width is a function of inclination angle for asymmetric tilt GB s. The misalignment amongst nanoscale columns in Al—Fe may facilitate or result from the 9R formation.

Recently ITBs have been successfully introduced into monolithic Al using Ag template. The Ag seed layer contains high-density growth twins due to its ultra-low SFE, 8 mJ/m². The TBs, mostly ITBs formed in Ag can propagate readily into Al as Al and Ag have nearly identical lattice parameter (<1% lattice mismatch). In situ nanoindentation studies show that ITBs in Al can induce high flow stress, ~300 MPa.

An approach to induce high density TBs in Al would be to reduce its SFE by alloying as lower SFE can promote the formation of growth twins. Hence the observation of high-density 9R phase in Al—Fe alloy suggests that the SFE of Al might have been reduced. However, DFT calculations in studies leading to this disclosure show just the opposite trend, that is, the SFE of Al—Fe is in fact higher than that of Al. Hence it is natural to ask why 9R phase would still form in Al—Fe alloy if its SFE is even greater than Al? The answer, without being bound by theory, is considered to be the significantly enhanced stability of 9R phase in Al—Fe due to the addition of Fe solutes. The equilibrium SF spacing in pure Al is small, ~0.3 nm, and the formation of SFs will naturally undergo a de-faulting process. De-faulting, in the context of this disclosure is intended to mean reduction or elimination of stacking faults or undoing the stacking faults. Similarly, the formation of growth and deformation twins in Al is also difficult, though feasible (when grain size is in the nanoscale regime). MD simulations in the studies leading to this disclosure show that TBs or SFs artificially introduced into Al will automatically de-twin (undoing the twins) or de-fault at room temperature. In contrast, high density SFs and TBs induced in Al—Fe are rather stable at room temperature. It is worth mentioning that Fe atoms are uniformly distributed throughout the entire films as examined by atomic resolution STEM.

Figure 4D:
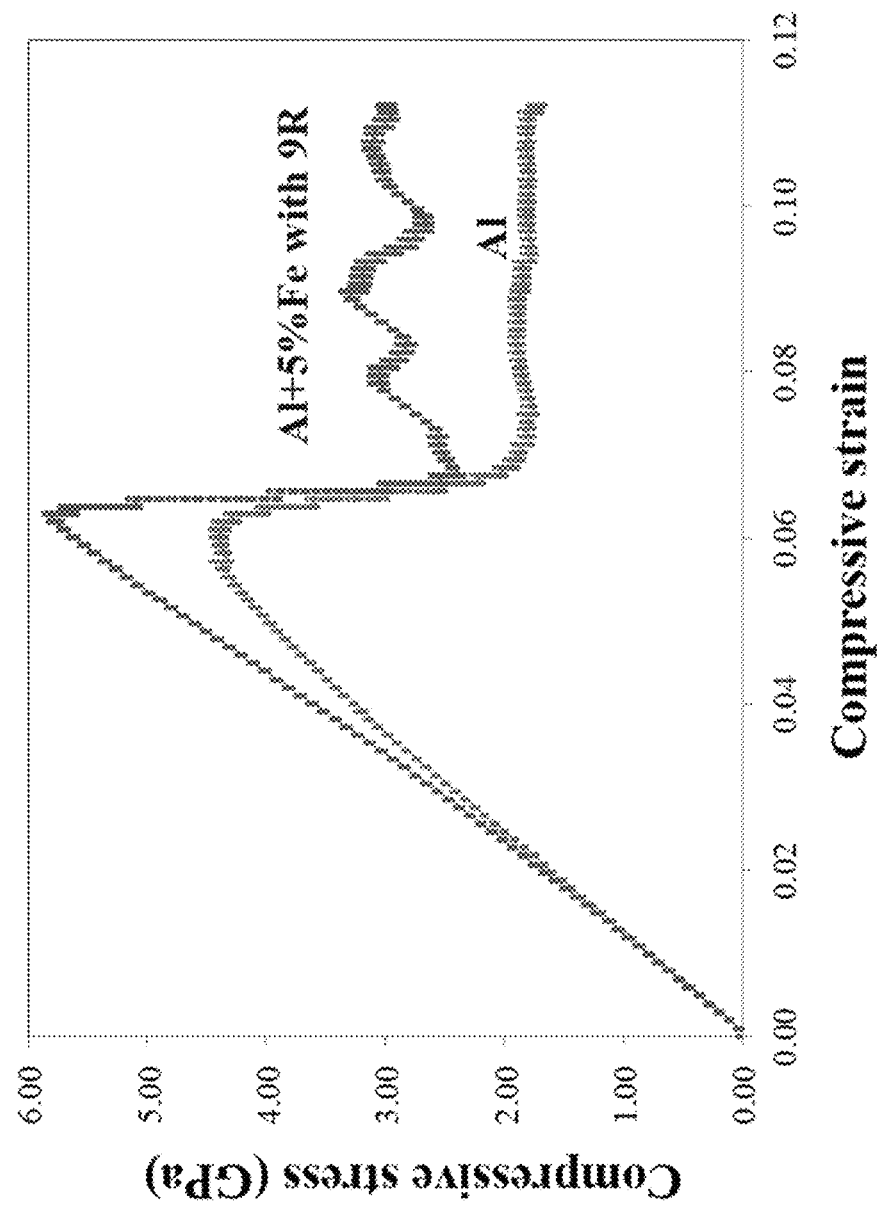
FIG. 4D shows a plot of compressive stress v. strain for alloy Al+5 atomic % Fe with 9R phase.
Figure 4E:
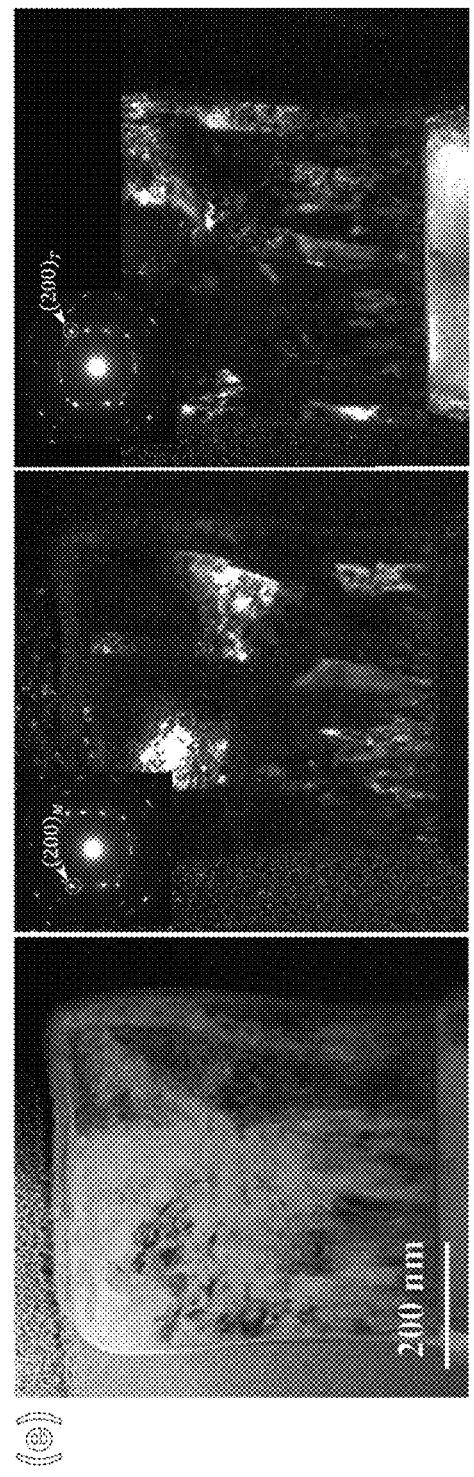
FIG. 4E shows post-mortem bright-field and corresponding $(200)_T$ and $(200)_M$ dark-field TEM images of the deformed Al-2.5% Fe pillar.
Figure 4F:
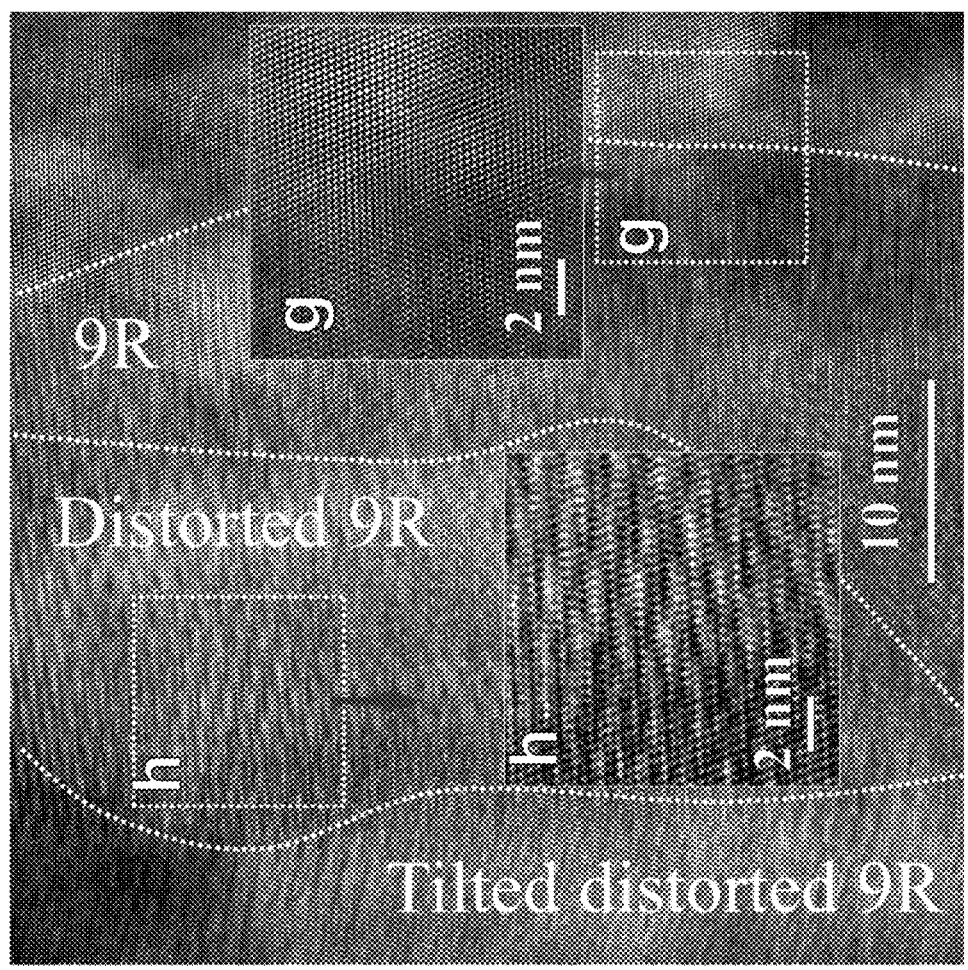
FIG. 4F shows TEM image demonstrating 9R phase that survives the deformation is greatly disturbed after the deformation.

MD simulations were performed to compare the mechanical behavior of nt Al with ITBs and nt Al—Fe with high-density SFs and 9R phase. Both materials have identical columnar grain sizes, 20 nm. In general, ITBs are strong barriers to the transmission of dislocations, and the yield strength and peak strength of nt Al reaches ~2 and 4 GPa, respectively. In nt Al—Fe with high density 9R phase, although the yield strength is comparable to that of nt Al, a much higher work hardening rate is observed, leading a peak strength of nearly 6 GPa. Significant work hardening observed in nt Al—Fe during MD simulations is in good agreement with the in situ compression results. MD simulations demonstrated that high-density stacking faults in Al—Fe are responsible for strong flow stress oscillation compared to the pure Al sample without stacking faults. Stacking faults impede the glide of dislocations and thus strengthen the Al alloy (corresponding to strain hardening). FIGS. 4A through 4C show MD simulations of uniaxial compressions on Al-5 at. % Fe with certain columns fully populated with 9R phase bounded by two perfect crystal columns with twin relation (T and M denote twin and matrix, respectively). The Fe solutes are uniformly distributed through the alloy films and the 9R columns and perfect crystal columns are indicated by arrows. The as-constructed structure and deformed structure at 8 and 10% strains, respectively, are directly compared in both 3D and 2D modes. MD studies show Fe-induced stability and sectional recovery of 9R phase as well as dislocation-9R interactions in Al-5% Fe specimen. Stacking faults in monolithic Al undergo recovery to perfect crystal at ambient temperature, whereas a considerable fraction of 9R phase survives deformation. Meanwhile partial 9R phase recovers, but left debris. The increased SFE makes defaulting/detwinning even more difficult. The dislocations are blocked by the stable and thick 9R and the strain hardening through dislocation-9R interactions is further promoted. Furthermore, the 9R is deformable and high-density partials within the 9R phase can migrate to accommodate plasticity. FIG. 4D shows a plot of compressive stress v. strain for alloy Al+5 atomic % Fe with 9R phase. FIG. 4E shows post-mortem bright-field and corresponding $(200)_T$ and $(200)_M$ dark-field TEM images of the deformed Al-2.5% Fe pillar. FIG. 4F shows TEM image demonstrating 9R phase that survives the deformation is greatly disturbed after the deformation. Referring to FIG. 4F, Distorted 9R is bounded by tilted 9R and undisturbed 9R.

The work hardening exponent in nt Al—Fe (shown in FIG. 3E) measured by in situ compression tests is ~0.6, comparing to ~0.4 for monolithic Al subjected to micropillar compression tests at the same strain rate. In addition, substantial load drop was observed in monolithic Al in FIG. 4D, whereas nt Al—Fe does not show any load drop during compression tests. In 3D MD simulations (FIGS. 4A through 4C), the substantial work hardening in nt Al—Fe can be attributed to extensive interactions of dislocations with SFs and 9R phase. Similarly, 2D MD simulations on a much greater cell, containing 9R phase in alternating grains (similar to experimental observations) show that the interaction of glide dislocations with 9R phase leads to work hardening. The high ductility of nt Al—Fe is thus underpinned by 9R phase dominated work hardening during compressive deformation. Of course, the ultra-high strength accomplished in Al—Fe is also related to the nanoscale grain size. But grain size alone is insufficient to explain the high strength in the materials.

It should be noted that all solutes do not have the same capability to stabilize the 9R phase in Al, and their effectiveness varies. For example, solutes such as molybdenum and tungsten are less effective to reduce the average grain size of Al comparing to Fe solute and hence these solutes may only moderately increase the strength of Al alloys. This inference is based on extensive studies performed through experiments leading to this disclosure on numerous other binary Al alloys, by using, Mo, W, Ag, and Cr as solutes. The studies showed that that these solutes were not as effective as Fe, Ni and Co to reduce grain size and/or produce 9R, and hence led to relatively insignificant strengthening effect. However, it may be possible to tailor processing conditions and chemistry to tune the effectiveness of different solutes in influencing grain size. Further, it should be recognized that there can be other solutes that can promote the formation of 9R phase and nanograins may also lead to high strength and plasticity in Al alloys.

It has been stated that FCC metals will undergo 9R expansion where double core Shockley partials pin one side of ITBs while shear stress is applied along <111> direction but experience boundary sliding and ITB and Shockley partial decoupling at applied shear along <110> direction. The texture of nt Al—Fe specimens may benefit the superb plasticity.

In this disclosure, high density twins and 9R phase are introduced into Al by using Fe solutes. The nt Al—Fe alloys achieve a hardness and a flow stress as high as 5.5 GPa and ~1.5 GPa, respectively, which is comparable to high strength martensitic steels. The in situ compressions reveal a ductile deformation of the nt Al—Fe alloys as well as capability for tremendous strain hardening. DFT calculations show that the Fe addition counterintuitively increases the SFE of Al so that a higher energy penalty is required to undergo detwinning and defaulting processes for the twin and 9R phase. MD simulations suggest the addition of Fe can appreciably improve the stability of 9R phase for further strain hardening the materials and the dislocation-ITB s interaction also attribute to the high strength and giant strain hardening.

It should be noted that based on fabrication of high-strength Al alloy coatings, bulk nanotwinned high-strength Al alloys can be fabricated. A non-limiting method to achieve this includes applying a surface mechanical grinding treatment technique to an Al ally casting to fabricate nt Al alloys. This severe plastic deformation technique can allow fabrication of 100 micron thick nanocrystalline Al alloy plates. The average grain size can approach 50-200 nm. Deformation will introduce high-density twins and stacking faults, and 9R phase. As the solutes will stabilize these stacking faults, the as-processed Al alloys can have high strength, 0.7-2 GPa, and high hardness, 2-5 GPa in the highly deformed surface layer of Al alloys.

Another method of achieving a high-strength Al alloy sheets includes applying rolling and forging to significantly reduce the thickness of Al alloy plates. Such dramatic rolling and forging experiments will also induce nanograins, high-density nanotwins and stacking faults into our Al alloys. This technique can provide Al alloy sheets that have 1-5 mm in thickness. By extensive application of such deformation processes, bulk nanotwinned Al alloys can be fabricated.

Figure 5A:
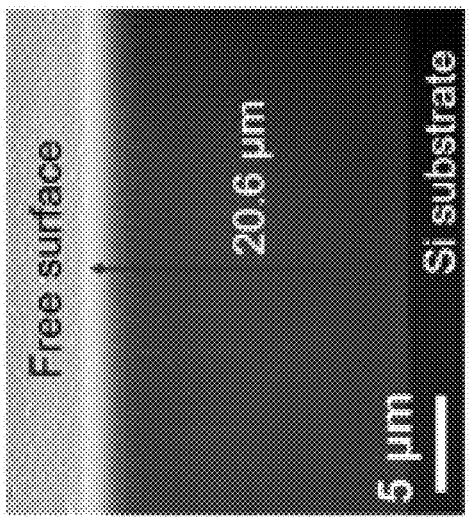
FIG. 5A shows a digital micrograph of ~20 μm thick Al-6 at. % Fe coating that well adheres to Si wafer with 3 inches in diameter.
Figure 5B:
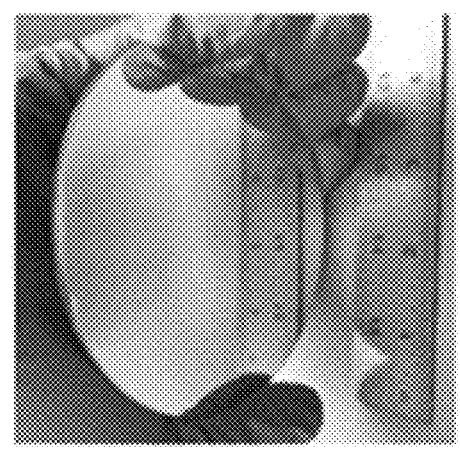
FIG. 5B shows a cross-sectional SEM micrograph of the 20 μm thick Al-6 at. % Fe coating.
Figure 5C:
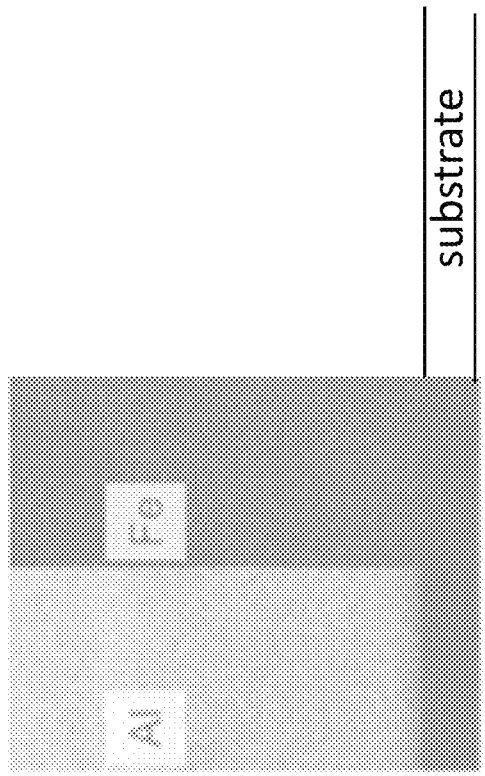
FIG. 5C shows corresponding EDS patterns of Al and Fe and Si.
Figure 5D:
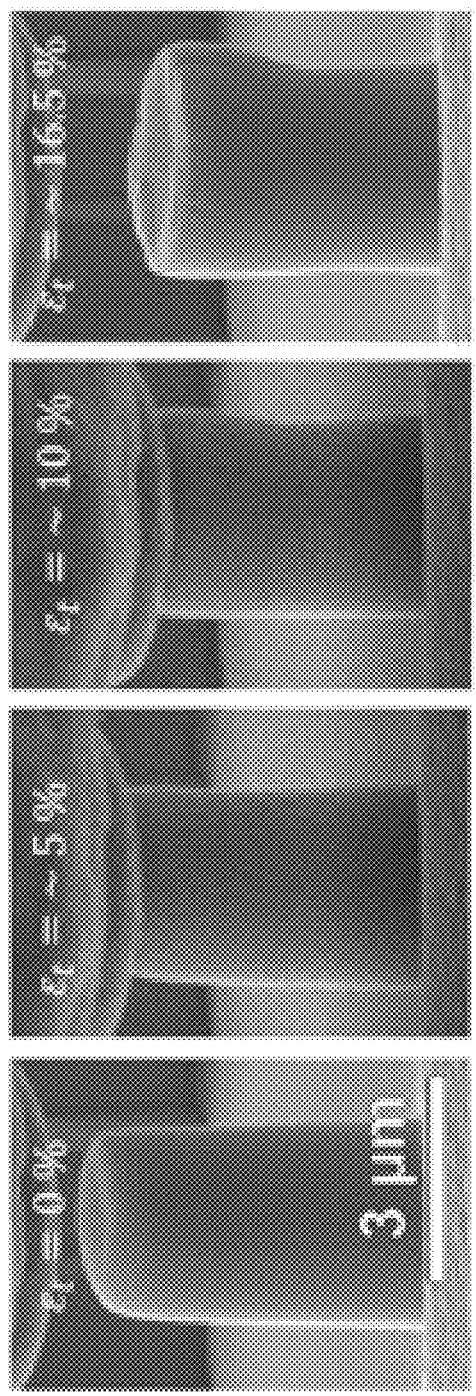
FIG. 5D shows the In situ compression tests applied on micropillars of Al-6 at. % Fe coating.
Figure 5E:
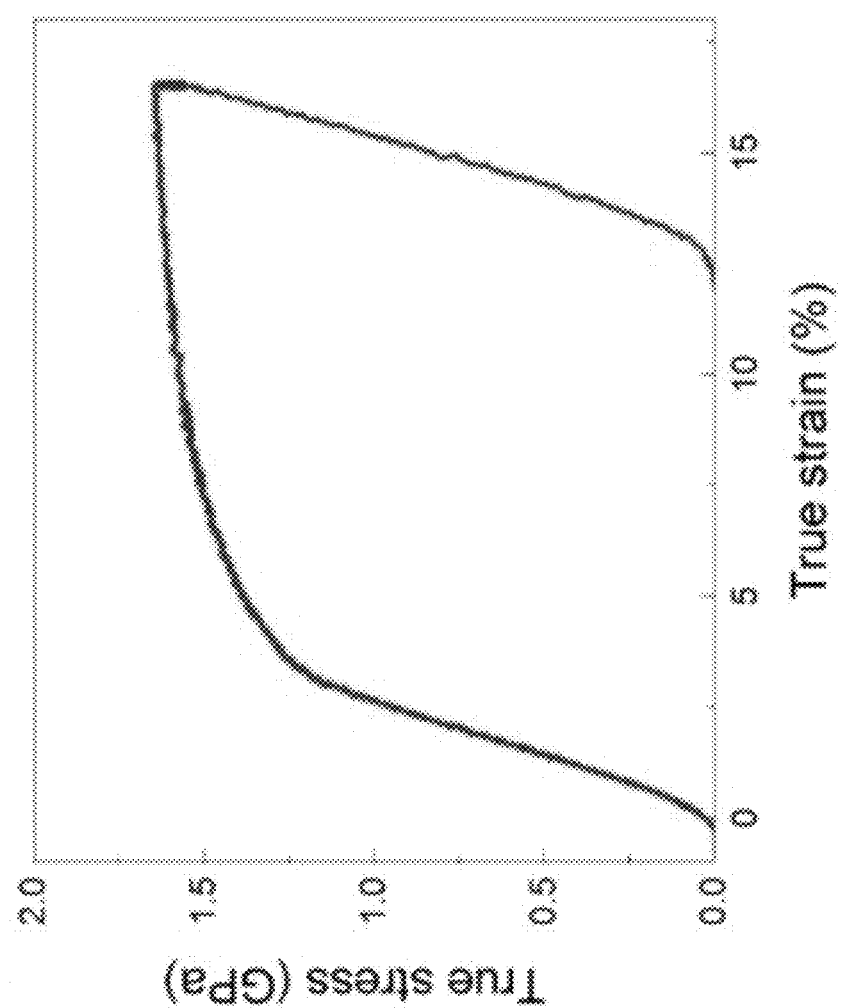
FIG. 5E shows the stress vs. strain curves for micropillars of Al-6 at. % Fe coating.

To evaluate the mechanical properties of thick Al—Fe coatings, 20 μm-thick Al—Fe coatings were deposited on Si wafers with ~3 inch in diameter using the magnetron sputtering technique with the same deposition parameters. FIG. 5A shows a digital micrograph of ~20 μm thick Al-6 at. % Fe coating that well adheres to Si wafer with 3 inches in diameter. FIG. 5B shows a cross-sectional SEM micrograph of the 20 μm thick Al-6 at. % Fe coating and FIG. 5C shows corresponding EDS patterns of Al and Fe and Si. FIG. 5D shows the In situ compression tests applied on micropillars of Al-6 at. % Fe coating. FIG. 5E shows the stress vs. strain curves for these micropillars with 3 μm in diameter. The stress-strain curve of FIG. 5E is in good agreement with results obtained from micropillars with 500 nm in diameter and ~1 μm in height presented above. These micropillars of large diameters show exceptionally high flow stress (>1.5 GPa) and strain hardening ability. Prior studies show that extrinsic size effect ("smaller is stronger") takes place when pillar diameter falls below critical value comparable to or finer than intrinsic microstructural features, where strengthening may arise from dislocation starvation for nanopillars made of single or coarse-grained crystals. To avoid such an extrinsic size effect induced strengthening, pillars with 3 μm in diameter and 7.5 μm in height have been fabricated and tested under the same strain rate. The flow stress of these large pillars remains high, exceeding 1.5 GPa (FIG. 5E), similar to the mechanical behaviors of pillars with 500 nm in diameter.

Based on the above detailed description, it is an objective of this disclosure to describe a high-strength aluminum alloy coating on a casting or a substrate. In one non-limiting embodiment, the casting comprises Al-5% Fe. The high-strength aluminum alloy coating of this disclosure contains aluminum, 9R phase, fine grains, nanotwins, stacking faults, and a solute capable of stabilizing the 9R phase, the fine grains, and the stacking faults. The nanosized grains with Fe-stabilized 9R, predominately account for the strength improvement. Fe enables the nanograin formation and the stability of 9R. To ensure that there is high strength, it is desirable at least nanocrystalline grain size. But 9R phase will make nanocrystalline metals even stronger. And more importantly, 9R phase enable outstanding deformability (plasticity). Thus in some embodiments of the coatings of this disclosure one or more of the listed features such as for example purposes only, 9R phase, nanotwins and stacking faults, may be absent, and yet some strength improvement can be realized.

The thickness of the high-strength aluminum alloy of this coating can be in the range of 0.1-200 micrometers. In this high-strength aluminum alloy coating the fine grains can be equiaxed or columnar. A non-limiting range for the size range of the fine grains in these coatings is 2 nm-10,000 nm.

In some preferred embodiments of the coatings of this disclosure, the fine grains are in the size range of 5 nm-200 nm. In the high-strength aluminum alloy coatings of this disclosure, the inter-twin spacing is in the range 1 nm-200 nm. Examples of solutes in the high-strength aluminum alloy coatings of this disclosure include, but not limited to, iron, cobalt, titanium, magnesium, and chromium. In some preferred embodiments of the coatings of this disclosure, the solute is iron and the iron content is in the range of 1-30 atomic percent.

In some embodiments of high-strength aluminum coating of this disclosure, the flow stress of the coating is in the range of 0.7-3.0 GPa and ductility of the coating is in the range of 5-30%. In some embodiments of the high-strength aluminum coating of claim 16, the flow stress of the coating is in the range of 1.0-2.0 GPa and ductility of the coating is in the range of 10-25%. In some embodiments of the high-strength aluminum coating of this disclosure, the hardness of the coating is in the range of 2.0-9.0 GPa and ductility of the coating is in the range of 5-30%. In some embodiments of the high-strength aluminum coating of this disclosure, the hardness of the coating is in the range of 2.0-9.0 GPa and ductility of the coating is in the range of 10-25%.

It is another objective of this disclosure to describe a method of making a high-strength aluminum alloy coating on a substrate. The method includes depositing on a substrate, atoms of the constituents of an aluminum alloy on the substrate utilizing a deposition method, wherein the deposited atoms form a high-strength aluminum alloy coating containing 9R phase, fine grains, nanotwins, and stacking faults. Non-limiting examples of alloying elements for the aluminum alloy coating formed in this method include iron, cobalt, titanium, magnesium, and chromium. The deposition methods include, but not limited to sputtering, evaporation, laser ablation, and physical vapor deposition. The substrate on which the high-strength aluminum-alloy coating is formed can be a semiconductor. Non-limiting examples of semiconductors suitable for this method include silicon, germanium, and gallium arsenide. In some embodiments of this method, the substrate can be a metal or an alloy. Non-limiting examples of metals suitable as substrates for this method include copper, nickel, aluminum, iron, and titanium. Non-limiting examples of alloys suitable as substrates for this method include an aluminum alloy copper alloy, a nickel alloy and a titanium alloy. In some embodiments of the method, the flow stress of the coating formed is in the range of 0.7-3.0 GPa and ductility of the coating is in the range of 5-30%. In some other embodiments of the method, the flow stress of the coating is in the range of 1.0-2.0 GPa and ductility of the coating is in the range of 10-25%. In some embodiments of the method the hardness of the coating is in the range of 2.0-9.0 GPa and ductility of the coating is in the range of 5-30%. In some other embodiments of the method, the hardness of the coating is in the range of 2.0-9.0 GPa and ductility of the coating is in the range of 10-25%. In some embodiments of the methods of this disclosure one or more of the listed features such as for example purposes only, 9R phase, nanotwins and stacking faults, may be absent, and yet some strength improvement can be realized.

It is another objective of this disclosure to describe a high-strength deformation layer in and on a casting of an aluminum alloy. The high-strength deformation layer of this disclosure includes an aluminum alloy containing aluminum, 9R phase, fine grains, nanotwins, stacking faults, and a solute capable of stabilizing the 9R phase, the fine grains, and the stacking faults. The high-strength deformation layer of this disclosure can contain fine grains which are equiaxed or columnar. The high-strength deformation layer of this disclosure can have fine grains in the size range of 2 nm-10,000 nm, a preferred range being 5 nm-200 nm. In some embodiments of the high-strength deformation layer of this disclosure, inter-twin spacing is in the range 1 nm-200 nm. Examples of solute in the high-strength deformation layer of this disclosure include, but not limited to, iron, cobalt, titanium, magnesium, and chromium. In some preferred embodiments, the solute is iron in the range of 1-30 atomic percent. In some embodiments of the high-strength deformation layer of this disclosure one or more of the listed features such as for example purposes only, 9R phase, nanotwins and stacking faults, may be absent, and yet some strength improvement can be realized.

It is yet another objective of this disclosure to describe a method of making a high-strength deformation layer in and on a casting of an aluminum alloy. The includes providing a casting of an aluminum alloy, and deforming the alloy by a deformation method, wherein the deformation results in a high-strength aluminum alloy comprising a deformation layer containing 9R phase, fine grains, nanotwins, and stacking faults. The deformation methods include, but not limited to grinding, rolling, extrusion, forging, and stamping. In some embodiments, the thickness reduction of the casting due to deformation is in the range of 20-50%. Alloying elements for the aluminum alloy of the casting of the method include, but not limited to iron, cobalt, titanium, magnesium, and chromium. In some embodiments of the method, the aluminum alloy of the casting contains iron in the range of 1-30 atomic percent. In some embodiments of the method of making high-strength deformation layer of this disclosure one or more of the listed features such as for example purposes only, 9R phase, nanotwins and stacking faults, may be absent, and yet some strength improvement can be realized.

Another aspect of this disclosure is employing the methods of fabricating the coatings of this disclosure to make articles and components for use several applications. Other embodiments of this disclosure include articles comprising the Al—Fe coatings of this disclosure. These articles include, such as, but not limited to, Al alloy coatings for spatial light regulator, high-strength wear and scratch resistant coatings; and micro- and nanoelectromechanical systems (M/NEMS) device. These articles find applications in aerospace industry, protective coatings; optical devices, sensors and actuators.}

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of making a high-strength aluminum alloy coating on a substrate, the method comprising:
   providing a substrate;
   depositing atoms of the constituents of an aluminum alloy on the substrate utilizing a deposition method, wherein the deposited atoms form a high-strength aluminum alloy coating containing 9R phase, grains in the size range of 2 nm-10,000 nm, nanotwins, and a solute capable of stabilizing the 9R phase.

2. The method of claim 1, wherein the deposition method is one of sputtering, evaporation, laser ablation, and physical vapor deposition.

3. The method of claim 1, wherein the substrate is a semiconductor.

4. The method of claim 3, wherein the semiconductor is one of silicon, germanium, and gallium arsenide.

5. The method of claim 1, wherein the substrate is a metal or an alloy.

6. The method of claim 5, wherein the metal is one of copper, nickel, aluminum, iron, and titanium.

7. The method of claim 5, wherein the alloy is one of an aluminum alloy, a copper alloy a nickel alloy and a titanium alloy.

8. The method of claim 7, wherein the aluminum alloy comprises one or more of iron, cobalt, titanium, magnesium, and chromium.

9. A high-strength deformation layer in and on a casting of an aluminum alloy, wherein the high-strength deformation layer includes an aluminum alloy comprising:
   aluminum;
   9R phase;
   grains in the size range of 2 nm-10,000 nm;
   nanotwins; and
   a solute capable of stabilizing the 9R phase.

10. The high-strength deformation layer of claim 9, wherein the fine grains are equiaxed or columnar.

11. The high-strength deformation layer of claim 9, wherein inter-twin spacing of the nanotwins is in the range 1 nm-200 nm.

12. The high-strength deformation layer of claim 9, wherein the solute is one of iron, cobalt, titanium, magnesium, and chromium.

13. The high-strength deformation layer of claim 12, wherein the solute is iron.

14. The high-strength deformation layer of claim 13, wherein the iron content is in the range of 1-30 atomic percent.

15. A method of making a high-strength deformation layer in and on a casting of an aluminum alloy, the method comprising:
   providing a casting of an aluminum alloy; and
   deforming the alloy by a deformation method, wherein the deformation results in a high-strength aluminum alloy comprising a deformation layer 9R phase, grains in the size range of 2 nm-10,000 nm, nanotwins, and a solute capable of stabilizing the 9R phase.

16. The method of claim 15, wherein the deformation method is one of rolling, extrusion, forging, and stamping.

* * * * *